US008958554B2

(12) United States Patent
Schneider

(10) Patent No.: US 8,958,554 B2
(45) Date of Patent: Feb. 17, 2015

(54) UNICODE-COMPATIBLE STREAM CIPHER

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 819 days.

(21) Appl. No.: 12/627,863

(22) Filed: Nov. 30, 2009

(65) Prior Publication Data

US 2011/0129086 A1 Jun. 2, 2011

(51) Int. Cl.
*H04L 29/06* (2006.01)
*H04L 9/06* (2006.01)

(52) U.S. Cl.
CPC ............ *H04L 9/065* (2013.01); *H04L 2209/34* (2013.01)
USPC ............. 380/42; 713/168; 713/187; 713/189; 713/193

(58) Field of Classification Search
CPC ............................ H04L 9/065; H04L 2209/34
USPC .......................................................... 380/42
See application file for complete search history.

(56) References Cited

U.S. PATENT DOCUMENTS

| 4,172,213 | A * | 10/1979 | Barnes et al. .................... 380/29 |
| 6,735,310 | B1 * | 5/2004 | Hsing et al. ...................... 380/28 |
| 7,349,959 | B2 * | 3/2008 | Imamura et al. ............... 709/223 |
| 7,418,098 | B1 * | 8/2008 | Mattsson et al. ................. 380/28 |
| 2002/0141573 | A1 * | 10/2002 | Henson et al. ................... 380/42 |
| 2003/0056118 | A1 * | 3/2003 | Troyansky et al. ........... 713/201 |
| 2003/0138099 | A1 * | 7/2003 | Schmidt .......................... 380/43 |
| 2004/0019786 | A1 * | 1/2004 | Zorn et al. ..................... 713/168 |
| 2004/0107025 | A1 * | 6/2004 | Ransom et al. ............... 700/286 |
| 2004/0109567 | A1 * | 6/2004 | Yang et al. .................... 380/277 |
| 2004/0111610 | A1 * | 6/2004 | Slick et al. .................... 713/160 |
| 2005/0066181 | A1 * | 3/2005 | Burns ............................ 713/187 |
| 2006/0107048 | A1 * | 5/2006 | Douceur et al. .............. 713/168 |
| 2007/0064946 | A1 * | 3/2007 | Ohkubo et al. ............... 380/267 |
| 2007/0237326 | A1 * | 10/2007 | Nonaka et al. .................. 380/37 |
| 2008/0294614 | A1 * | 11/2008 | Miyashita et al. ................ 707/4 |
| 2009/0316885 | A1 * | 12/2009 | Mahmud ......................... 380/28 |
| 2010/0074441 | A1 * | 3/2010 | Pauker et al. ................... 380/45 |

OTHER PUBLICATIONS

Douceur et al., A Secure Directory Service based on Exclusive Encryption, Dec. 2002, Proceedings of the 18th Annual Computer Security Applications Conference, pp. 172-182.*

* cited by examiner

*Primary Examiner* — Taghi Arani
*Assistant Examiner* — Kenneth Chang
(74) *Attorney, Agent, or Firm* — Lowenstein Sandler LLP

(57) ABSTRACT

A process and system for enciphering and deciphering Unicode characters that is compatible with scripting languages such as JAVASCRIPT®, JSCRIPT® and VBSCRIPT®. The process and system can encipher each character individually and maintain the size of the character. The enciphered character is deciphered at the application layer at the client to provide endpoint security.

15 Claims, 4 Drawing Sheets

UNICODE-COMPATIBLE STREAM CIPHER

TECHNICAL FIELD

Embodiments of the present invention relate to enciphering and deciphering Unicode characters. Specifically, the embodiments of the present invention relate to a system and method for enciphering and deciphering a stream of Unicode characters.

BACKGROUND

Client side scripting languages such as JAVASCRIPT® by Netscape Communications of Dulles, Va. and VBSCRIPT® or JSCRIPT® by Microsoft Corporation of Redmond, Wash. do not include functionality enabling them to properly compose character values from encodings. Rather, these scripting languages treat characters within a string as atomic entities.

This handling of character values becomes an issue because there is a mismatch between the way the C programming language, which is the implementation language for many web servers such as APACHE HTTPD® maintained by the Apache Software Foundation of Forrest Hills, Md., and how these client-side scripting languages handle character data. Within the C programming language, characters are represented as arrays of small integer values (typically, 8 bits, although 16 bits per character is also possible). The C programming language relies upon a standard library to provide interpretation and rendering of character data. However, within the C programming language itself, the character data is just binary data. The same problem exists for web servers implemented in the C++ and similar programming languages that handle character data as arrays of integers.

In contrast, scripting languages like JAVASCRIPT® will not compose character values from encodings. When using a Unicode Transformation Format (UTF)-8 encoding of characters outside the range from 0-127, the client side programmers must be careful to handle the encoding/decoding correctly or the JAVASCRIPT® programs may generate strings with inappropriate encodings. For example, the character "π" corresponds to the code point code point U+3C0 in Unicode 2.0. In UTF-8, this is represented by two bytes of data 0xcf, 0x80 (in hexadecimal representation). A string containing the character "π" can be constructed by passing the value 0x3c0 to the String.fromCharCode( ) method in JAVASCRIPT®, but passing the bytes 0xcf, 0x80 will result in a two character string Ï <pad>, where the second character is actually a control character.

This scenario creates an additional problem in the context of cryptography, because most cryptographic algorithms operate on binary data without regard to character encodings. The cryptography algorithms rely on external systems to manage character data appropriately. However, these external management systems do not exist in scripting languages like JAVASCRIPT®. As a result, enciphering data at a server to be deciphered by the scripting languages at a client becomes unreliable when character data is involved.

BRIEF DESCRIPTION OF THE DRAWINGS

Embodiments of the invention are illustrated by way of example and not by way of limitation and the figures of the accompanying drawings in which like references indicate similar elements. It should be noted that different references to "an" or "one" embodiment in this disclosure are not necessarily to the same embodiment, and such references mean at least "one."

DETAILED DESCRIPTION

Figure 1:
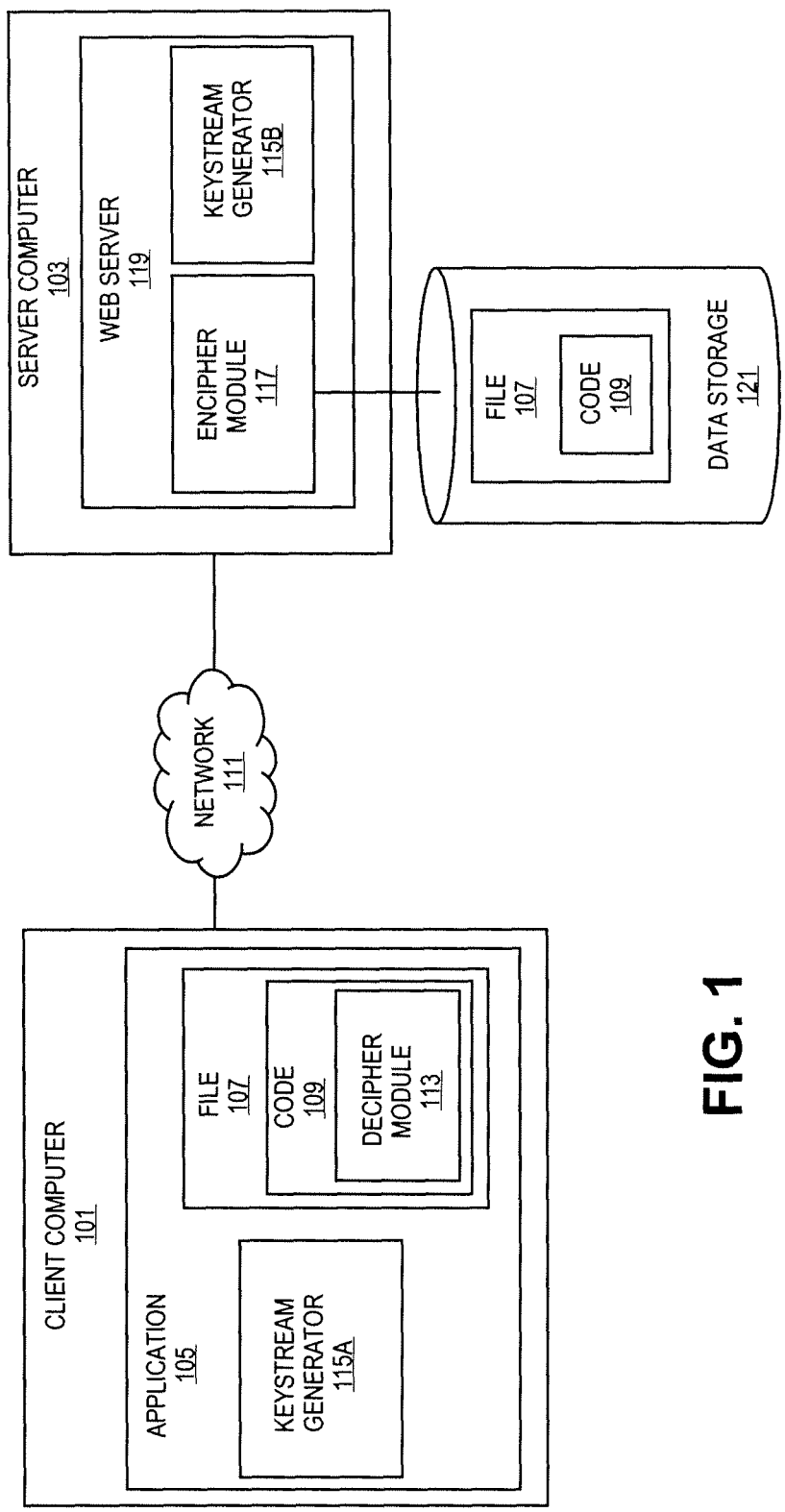
FIG. 1 is a block diagram illustrating a system for a Unicode-compatible enciphering between a client and a server.

FIG. 1 is a block diagram illustrating a system for a Unicode-compatible enciphering between a client and a server. In one embodiment, the system is implemented in a client-server framework. The system can support any number of client computers 101 communicating with any number and combination of server computers 103. The transmission and enciphering of Unicode characters occurs between the server computer 103 and client computers 101. The relationship between client computers 101 and servers 103 relative to the enciphered data is a one to one relationship. The client computer 101 and server computer 103 share a key that enables the enciphering of stream-based Unicode characters at the server computer 103 and the deciphering of the stream-based Unicode characters at the client computer 101. The key can be shared by use of any key sharing methodology or protocol.

The client computer 101 can be any type of computing device including a desktop computer, handheld computer, laptop computer or similar computing device. The client computer 101 can execute any number of applications 105 that can request services and resources from the server computer 103. The application 105 can be a web browser or similar client application. The application 105 can include a keystream generator 115A. The keystream generator 115A creates a stream of pseudo-random bits using algorithms such as RC4® by EMC Corporation of Hopkington, Mass. and/or similar algorithms capable of generating pseudo-random bit streams.

The application 105 can process a file 107 or similar source of character data that is obtained from the server computer 103. A file 107 is provided as one example of a source of character data. The character data can come from any source (e.g., a result of a database query or similar output). The file 107 can be any type of document or program. For example, the file 107 can be a web page provided by a web server 119 running on the server computer 103. The file 107 can include a code section written in a scripting language or similar programming language. The scripting language can be JAVASCRIPT®, VBSCRIPT®, JSCRIPT® or similar scripting language that is interpreted by the application 105 or an associated program. The code 109 can include a decipher module 113 that provides a set of functions that decipher content received from the server computer 103 at the application layer. The decipher module 113 works in conjunction with the enciphering module 117 to provide endpoint security, which addresses threats related to the interpretation of the contents of the file 107, e.g. interpretation a web page on the client computer 101 by the application 105. These threats can come from programs or scripts executed on the client computer 101 that attempt to make use of the contents of files that are accessed by the application 105 that may contain sensitive data. By enciphering this data and requiring that the decipher module 113 to decipher the data after it is received, the malicious programs are denied access to the sensitive data.

The server computer 103 can be any type of computing device including a desktop computer, laptop computer, dedicated server or similar computing device. The server computer 103 can execute any number of web servers 119 or similar programs that provide resources to the client computer 101. The web server 119 can be Apache HTTPD or similar web server. The web server 119 can provide access to files 107 stored in a storage device 121 local to or remote from the server computer 103. The files 107 include code 109 that can include the decipher module 113. In another embodiment, the decipher module 113 is inserted into the code 109 and file 107 and stored separately. In a further embodiment, decipher module 113 is a part of the application 105 or a library on the client computer 101.

The web server 119 can include an encipher module 117 and keystream generator 115B. These components can also be modules that are separate from the web server 119 such as functions in a library. The encipher module 117 is called by the web server 119 to encipher content of files 107 that have been requested by a client computer 101. The encipher module 117 can also be utilized to encipher dynamically generated content from the web server 119. For sake of clarity, the processing and enciphering of a file 107 is discussed herein, however, one skilled in the art would understand that the techniques and structures utilized to encipher file contents can also be applied to other sources of data such as dynamically generated data from the web server. The encipher module 117 relies on the keystream generator 115B to generate a pseudo-random bit stream that is utilized in the enciphering operations. The encipher module 117 enciphers the content of the file 107 or a sub-set of the content of the file 107 one character at a time. The encipher module 117 can produce enciphered data that is identical in size to or close in size to the input data. This minimizes the bandwidth requirements over the network 111 for sending the file 107 to the client computer 101. The enciphering process provided by the encipher module 117 is described in greater detail herein below. The encipher module 117 and its process are complemented by the decipher module 113, which provides a reverse method from that employed by the encipher module 117.

The network 111 can be any type of communication network including a local area network (LAN), wide area network (WAN), such as the Internet, or similar communication network. The network 111 can include any number of computing devices and network devices. The network 111 can include both wired and wireless components and links.

Figure 2:
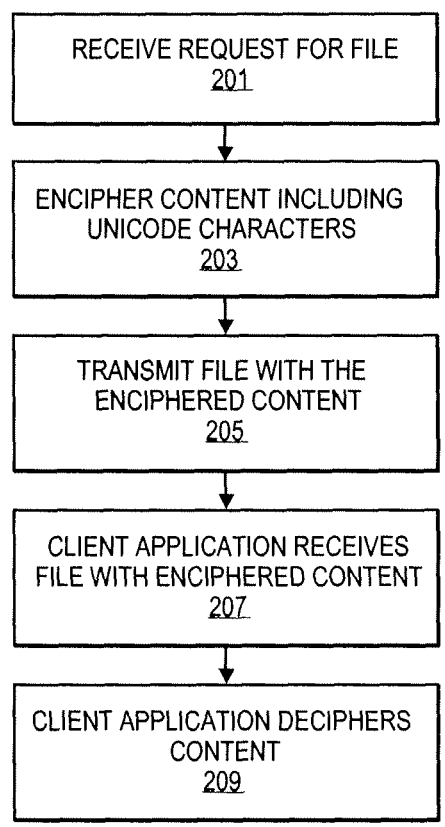
FIG. 2 is a flowchart of one embodiment of a process for servicing requests for files including character data enciphered with a stream-based Unicode character enciphering.

FIG. 2 is a flowchart of one embodiment of a process for servicing requests for files including character data enciphered with a stream-based Unicode character enciphering. In one embodiment, the process can be initiated in response to a request for a file or similar data structure from a client computer (block 201). This can be a request for a web page or similar resource received from a web browser by a web server over a network. In other embodiments, the character data can be received from any source as an input stream. The source can be a memory buffer, a file, a record in a database, a transmission received over a network or similar source of character data. For sake of clarity the example of a file is described.

The server retrieves the requested file and enciphers the content of the file to provide endpoint security by requiring that the content be deciphered at the application layer on the client computer. This is distinct from any transport layer encryption (e.g., secure socket layers), which provides security during the communication of the file between the server computer and the client computer. The enciphering of the data is done character by character by an enciphering module (Block 203). The content can contain any number or amount of Unicode characters, such as characters in UTF-8 or similar encoding. The specific handling of the individual Unicode character enciphering is discussed below.

The file with the enciphered content is then transmitted to the client computer (block 205). The file can be transmitted to the client computer using any set of transport and communication protocols and technologies.

The client computer receives the file, which is handled by the requesting application. The requesting application receives the file with the enciphered content (block 207). The file can include both ciphered and clear or plain-text data. The file can include the code that provides the functionality for deciphering the enciphered data. Alternately, the code that provides the functionality for deciphering the enciphered data may be provided separately. The file may contain a reference to this separately provided code. The application can then execute or call the decipher module to decipher the content (block 209). The deciphered content can then be displayed to the user of the client application or processed by the client application.

Figure 3:
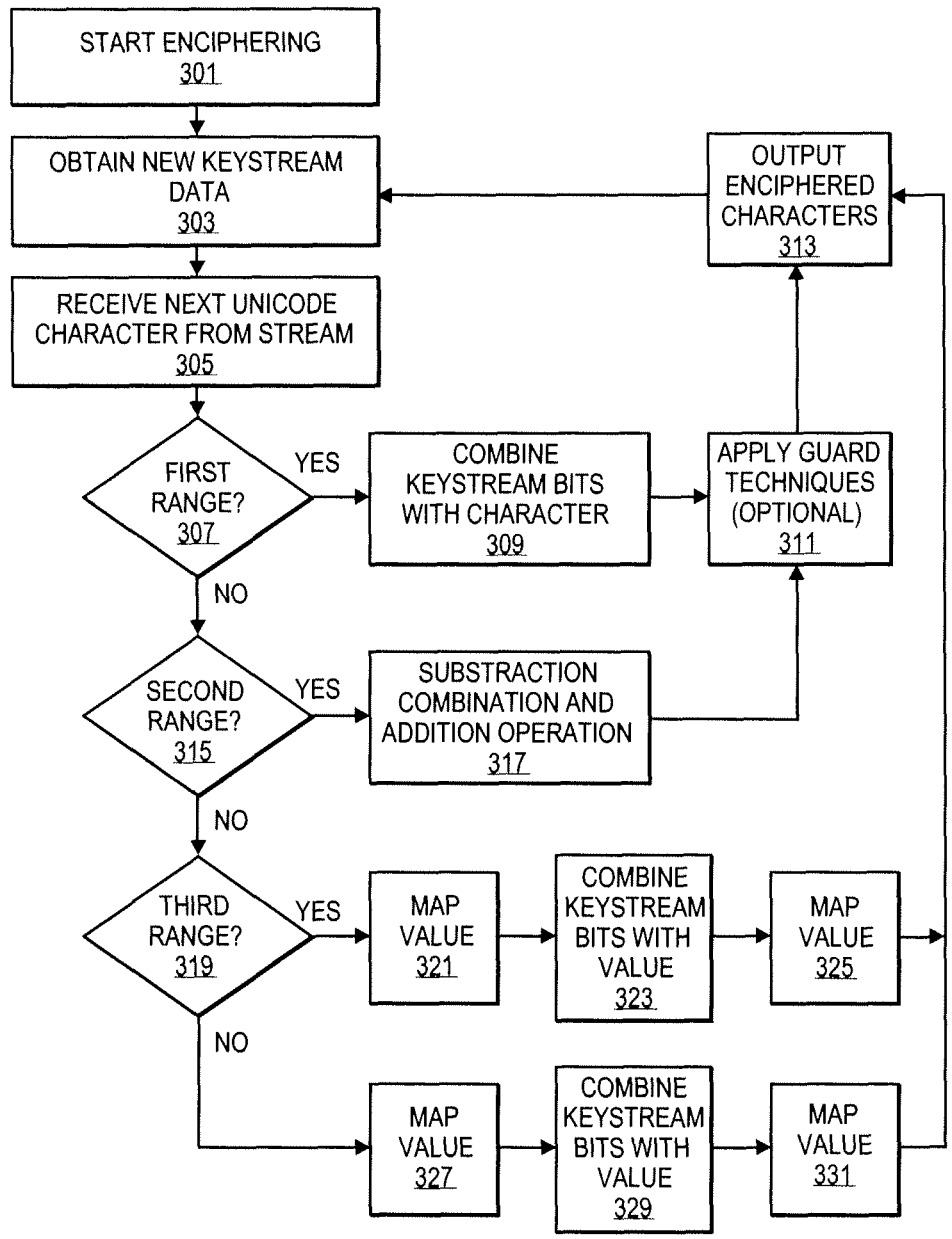
FIG. 3 is a flowchart of one embodiment of a process for stream based Unicode character enciphering.

FIG. 3 is a flowchart of one embodiment of a process for stream-based Unicode character enciphering. Unicode is an attempt at providing a complete universal character set. For most modern phoneme-based scripts (such as Latin or Cyrillic), all of the required characters in the script are in the first 55,296 characters of Unicode. Indeed, for most languages, the number of characters used is a small fraction of the total range of Unicode characters. Unicode characters each have a code point associated with them. The range of valid code points includes numerous gaps and also includes code points associated with control commands, formatting and similar non-character elements that are not displayable. As a result, any ciphering of Unicode characters for use with scripting languages needs to take these elements into consideration.

In one embodiment, the enciphering process is initiated by an enciphering module in response to a call by a web server or similar application (Block 301). The web server provides a stream of characters to be enciphered from a file or similar source as an input stream. The encipher module includes or interacts with a keystream generator to obtain a set of pseudo-random bits based on a key shared with the client computer (Block 303). These pseudo-random bits will be combined with the value of the Unicode character to be enciphered based on an operation that is dependent on the range into which the Unicode character falls. The keystream generator can be cycled or called any number of times to obtain the number of bits needed for the enciphering. In one embodiment, 20 bits are obtained from a keystream generator that generates 20 bits at a time. The keystream generator can be any byte-oriented keystream generator, such as a generator based on the RC4 algorithm cycled three times, keeping 20 bits from the output.

The next Unicode character is received as an input or obtained from the file or similar source to be processed (Block 305). The enciphering operations to be applied to the Unicode character correspond to specific discrete character ranges. These ranges can be distinguished by features of the output stream, so this enciphering method is not as secure as a method that would not differentiate between the ranges such as a block approach to enciphering the data. However, this method of enciphering and deciphering can proceed a character at a time, and the implementation can be tuned to keep the output size exactly the same size as the input size.

The Unicode character is analyzed to determine if its code point falls within a first range of characters (Block 307). The first range of characters is the set of characters with code points in the range U+0000-U+007f, corresponding to those characters with a UTF-8 representation of a single octet (byte). To encipher a character in this range, 7 bits are taken from the keystream, and combined with the character's scalar value to form a new scalar value (Block 309). This is a value that can be converted to a character by the client. The value is handled by the web server and other software as a small integer. The client application may display the value as a character.

The operation that combines the keystream bits with the character value can be any reversible binary operation. For example, an XOR can be used as the combining operation. In other embodiments, addition and subtraction modulo 128 can be used as the combining operation. At the expense of possible data expansion, the combination operation can include multiplication modulo a small prime (e.g., the operation can add 3 to the scalar value of the character and the 7 bits from the keystream, interpreted as an integer, and then multiply modulo 131). If the keystream can be guaranteed to never produce an all-zero block, combining the character and keystream bits could be accomplished by multiplication over $GF(2^7)$.

The operations on characters in this range could result in strings that are difficult for the receiving client application to manage, as they may contain control characters or the delete character. The client applications may also need to reserve certain characters for quoting purposes. These problems can be solved in a few different ways, using guard techniques, all of which impact either security, data size or both (Block 311). If the endpoints of the enciphered data stream can be reliably determined, then it is undesirable to employ these guard techniques.

The first guard technique would be to reserve one (or a few) characters as an escape character, and to designate that any values following the escape value be treated specially. For example, the '!' character could be designated as an escape value. When producing output, if the enciphering operation would produce a character that the client application can't manage in the data stream, the produced character is replaced by an escape character and an additional character that provides the information to decode the actual character.

For example, the following table could be used for these replacements:

TABLE I

| Code point | Character | Replaced with |
|---|---|---|
| U+0000 | NUL | !0 |
| U+0001 | SOH | !1 |
| U+0002 | STX | !2 |
| U+0003 | ETX | !3 |
| U+0004 | EOT | !4 |
| U+0005 | ENQ | !5 |
| U+0006 | ACK | !6 |
| U+0007 | BEL | !7 |
| U+0008 | BS | !8 |
| U+0009 | HT | !9 |
| U+000a | LF | !a |
| U+000b | VT | !b |
| U+000c | FF | !c |
| U+000d | CR | !d |
| U+000e | SO | !e |
| U+000f | SI | !f |
| U+0010 | DLE | !g |
| U+0011 | DC1 | !h |
| U+0012 | DC2 | !i |
| U+0013 | DC3 | !j |
| U+0014 | DC4 | !k |
| U+0015 | NAK | !l |
| U+0016 | SYN | !m |
| U+0017 | ETB | !n |
| U+0018 | CAN | !o |
| U+0019 | EM | !p |
| U+001a | SUB | !q |
| U+001b | ESC | !r |
| U+001c | FS | !s |
| U+001d | GS | !t |
| U+001e | RS | !u |
| U+001f | US | !v |
| U+0020 | SP | !w |
| U+0021 | ! | !x |
| U+0022 | " | !y |
| U+0027 | ' | !z |
| U+005c | \ | !A |
| U+007f | DEL | !B |

This example table would be suitable for use with JAVASCRIPT®; in addition to the control characters; it also covers quoting characters used by that language. There are 38 entries in this table. Since the results would be essentially distributed at random, this would be an average data expansion of 29.7%. But it would be no less secure than not escaping the characters.

If data expansion is not acceptable, the set U+0000-U+0007f can be further partitioned into the sets U+0021-U+007e and U+0000-U+0020, U+007F. The 94 characters in the range U+0021-U+007e could be combined with the entire 20 bit keystream entry, and the sum then reduced modulo 94. The other characters would be passed through, as-is. This is significantly less secure; an attacker would be able to perform statistical analysis and come to accurate conclusions about the input plain-text, just based on the presence of space characters.

After any guard techniques are applied the process outputs the enciphered character as an output stream (Block 313). The process then continues to handle the next Unicode character (Block 305) and obtain the next keystream value (Block 303). This process can continue until all the input or available characters from the source have been enciphered and output.

If a Unicode Character does not fall into the first range of characters, then the Unicode character is analyzed to determine if it falls in the next range of characters, which is U+0080-U+07ff (Block 315). This range corresponds to the characters with two byte encodings in UTF-8. Enciphering these characters can be accomplished by subtracting 0x80 from the scalar value, combining the result with the 20 bits from the keystream, and adding back the 0x80 (Block 317). With the proper combining operation, the subtraction step could be virtual. For example, a 20 bit keystream value could be added to the scalar value, the result taken modulo 1920 (the number of characters in this range), and 0x80 added to that value.

The enciphering of the characters in the second range could possibly generate code points in the range U+0080-U+009f. These are also considered to be "control"-characters. However, they are less likely to occur in texts, so passing them through as-is, and coding the remaining 1,888 values, while still reducing the security of the overall scheme, is less of a concern than passing through the other control characters. If generated control characters are going to be escaped (Block 311), the 32 characters in this range could be coded using escapes from the preceding sequence. This would be a data expanding transformation in absolute terms, if the output were something other than UTF-8.

If a Unicode character does not fall within the first two ranges, then the Unicode value is analyzed to determine if it falls in the third set of characters, which is made up of the ranges U+0800-U+d7ff, U+e000-U+fdcf, and U+fdf0-U+fffd. This is the list of all characters that are valid with a three byte UTF-8 representation. Note that some applications may be able to generate or consume characters with code points in the range U+fdd0-U+fdef, so this range may also be included. Characters within this set of 61,406 characters (or 61,438 characters, if the non-characters U+fdd0-U+fdef are included) are mapped to an integer in the range 0-61,405 (or 0-61,437) (Block 321). This mapped value is combined with the 20 bit keystream value (Block 323), and the result is then mapped back to a character (Block 325). The combining operation can be an XOR or similar combining operation. The mapping step can be accomplished easily by a sequence of decision-subtract instructions. For instance, something like this code written in the C programming language:

codepoint-=0x800;
if(codepoint>=0xe000-0x800)
codepoint-=0x800;
if(codepoint>=0xfdf0-0x1000)
codepoint-=0x20;

This assumes the code point was a valid Unicode character in the first place.

If the Unicode character does not fall in the other ranges, it can be assumed or analyzed to confirm that it falls in the last set of characters. The last set of characters are those in the ranges U+10000-U+1fffd, U+20000-U+2fffd, and U+100000-U+10fffd. This is a range of 1,048,544 code points. Enciphering a value in this range includes mapping from a character to an integer (Block 327), combining the integer with the 20 bits of keystream (Block 329), and mapping the result back to a character (Block 331). The operation to combine the keystream bits with the mapped integer creates a few problems. Just adding a 20 bit keystream value to the integer, and then reducing the result modulo 1,048,544, will produce a very slight bias. There will be 1 in 32,767 too many results in the range 0-31. To avoid this bias, the keystream bits can be rejected if they form an integer greater than 1,048,543.

In each case, after the Unicode character has been enciphered, the value is output as an output stream (Block 313) and the next set of keystream bits (Block 303) and the next Unicode character (Block 305) are obtained until all of the characters from the file or other source have been processed. The deciphering process is an exact reversal of this process. For sake of clarity, the deciphering process has not been set forth. One skilled in the art would understand that given the above described enciphering process the deciphering process can be implemented as a reverse of the enciphering process.

Figure 4:
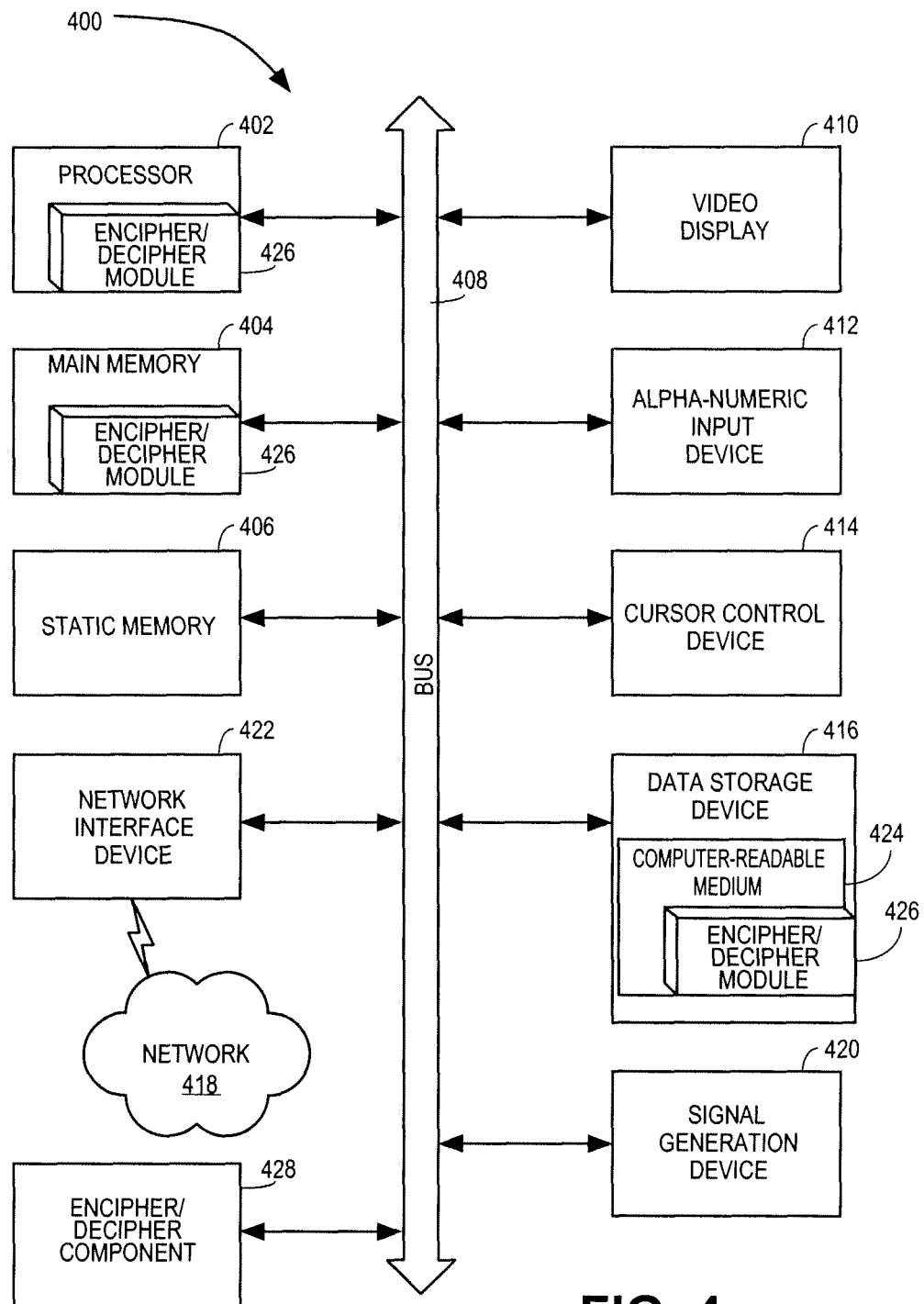
FIG. 4 is a diagram of one embodiment of a computer system for implementing stream-based Unicode character enciphering and deciphering.

FIG. 4 is a diagram of one embodiment of a computer system for implementing stream based Unicode character enciphering. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer executing the decipher module and the server computer executing the encipher module) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine.

Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, or dynamic random access memory (DRAM) such as synchronous DRAM (SDRAM), etc.), a static memory 406 (e.g., flash memory, static random access memory (SRAM), etc.), and a secondary memory 416 (e.g., a data storage device in the form of a drive unit, which may include fixed or removable computer-readable medium), which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the encipher/decipher module 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the encipher/decipher module 426) embodying any one or more of the methodologies or functions described herein. The encipher/decipher module 426 may also reside, completely or at least partially, within the main memory 404 and/or within the processing device 402 during execution thereof by the computer system 400, the main memory 404 and the processing device 402 also constituting machine-readable storage media. The encipher/decipher module 426 may further be transmitted or received over a network 418 via the network interface device 422.

The machine-readable storage medium 424 may also be used to store the encipher/decipher module 426 persistently. While the machine-readable storage medium 424 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

The encipher/decipher module 426 can also be a discrete component 428 that performs the functions described herein. The encipher/decipher component 428 can be any type of special purpose or programmed device in communication with the computer system over the bus or through a network connection.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "enciphering," "transmitting," "deciphering," "identifying," "selecting," "restricting," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for enciphering and deciphering stream based Unicode characters has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a processing device, a stream of Unicode characters from an input stream;
    identifying a character range out of a plurality of character ranges for each Unicode character of the stream of Unicode characters;
    selecting an enciphering operation in view of the identified character range, wherein each of the plurality of character ranges corresponds to a respective enciphering operation;
    enciphering, by the processing device, each Unicode character of the stream of Unicode characters with the selected enciphering operation, wherein the enciphering comprises obtaining a plurality of bits in view of a key shared with another processing device and combining the each Unicode character with one or more of the plurality of bits with a reversible binary operation;
    restricting the each enciphered Unicode character to exclude control characters and reserved characters; and
    outputting the each enciphered Unicode character in an output stream.

2. The method of claim 1, wherein the input stream is produced by a source that does not distinguish between character data and binary data.

3. The method of claim 1, wherein combining the each Unicode character with one or more of the plurality of bits comprises:
    combining the each Unicode character with one or more of the plurality of bits in view of the enciphering operation that is selected in view of a value of the each Unicode character.

4. The method of claim 1, wherein the each enciphered Unicode character comprises an escape character that is selected to replace an intermediate value produced by the enciphering.

5. The method of claim 1, wherein the each enciphered Unicode character is a same size as the Unicode character.

6. The method of claim 1, wherein the enciphering is implemented in C or C++.

7. A non-transitory machine-readable storage medium, having instructions stored therein, which when executed, cause a processing device to perform operations comprising:
    receiving a stream of Unicode characters from an input stream;

identifying a character range out of a plurality of character ranges for each Unicode character of the stream of Unicode characters;

selecting an enciphering operation in view of the identified character range, wherein each of the plurality of character ranges corresponds to a respective enciphering operation;

enciphering each Unicode character of the stream of Unicode characters with the selected enciphering operation, wherein the enciphering comprises obtaining a plurality of bits in view of a key shared with another processing device and combining the each Unicode character with one or more of the plurality of bits with a reversible binary operation;

restricting the each enciphered Unicode character to exclude control characters and reserved characters; and outputting the each enciphered Unicode character in an output stream.

8. The non-transitory machine-readable storage medium of claim 7, wherein the input stream is produced by a source that does not distinguish between character data and binary data.

9. The non-transitory machine-readable storage medium of claim 7, wherein the operations further comprise:

combining the each Unicode character with one or more of the plurality of bits in view of the enciphering operation that is selected in view of a value of the each Unicode character.

10. The non-transitory machine-readable storage medium of claim 7, wherein the each enciphered Unicode character comprises an escape character that is selected to replace an intermediate value produced by the enciphering.

11. The non-transitory machine-readable storage medium of claim 7, wherein each enciphered Unicode character is a same size as the Unicode character.

12. The non-transitory machine-readable storage medium of claim 7, wherein the enciphering is implemented in C or C++.

13. A system comprising:

a processing device; and a memory to store an encipher module, executable by the processing device, the processing device to:

receive a stream of Unicode characters from an input stream;

identify a character range out of a plurality of character ranges for each Unicode character of the stream of Unicode characters;

select an enciphering operation in view of the identified character range, wherein each of the plurality of character ranges corresponds to a respective enciphering operation;

encipher each Unicode character of the stream of Unicode characters with the selected enciphering operation, wherein to encipher comprises obtaining a plurality of bits in view of a key shared with another processing device and combining the each Unicode character with one or more of the plurality of bits with a reversible binary operation;

restrict the each enciphered Unicode character to exclude control characters and reserved characters; and output the each enciphered Unicode character in an output stream.

14. The system of claim 13, wherein the input stream is produced by a source that does not distinguish between character data and binary data.

15. The system of claim 13, wherein the each enciphered Unicode character is a same size as the Unicode character.

* * * * *